(12) United States Patent
Neulieb et al.

(10) Patent No.: US 9,643,587 B2
(45) Date of Patent: May 9, 2017

(54) SEQUENCE VALVE FOR A BRAKE CYLINDER HAVING AN AUTOMATIC PARKING BRAKE

(71) Applicant: NEW YORK AIR BRAKE, LLC, Watertown, NY (US)

(72) Inventors: Robert Neulieb, Theresa, NY (US); Howard Huber, Jr., Black River, NY (US); Keith Parnapy, North Bangor, NY (US); Christopher J. Ferguson, Watertown, NY (US); Jeffrey Sauter, Lowville, NY (US)

(73) Assignee: NEW YORK AIR BRAKE, LLC, Watertown, NY (US)

( * ) Notice: Subject to any disclaimer, the term of this patent is extended or adjusted under 35 U.S.C. 154(b) by 128 days.

(21) Appl. No.: 14/841,968

(22) Filed: Sep. 1, 2015

(65) Prior Publication Data

US 2017/0057482 A1    Mar. 2, 2017

(51) Int. Cl.
*B60T 15/22* (2006.01)
*B60T 15/18* (2006.01)

(52) U.S. Cl.
CPC ............ *B60T 15/22* (2013.01); *B60T 15/184* (2013.01)

(58) Field of Classification Search
CPC ........ B61H 11/00; B61H 11/02; B61H 13/00; B61H 13/005; B60T 15/22; B60T 15/184; B60T 15/185
USPC .......................................... 303/7, 8, 22.6, 40
See application file for complete search history.

(56) References Cited

U.S. PATENT DOCUMENTS

| 6,729,696 B2 | 5/2004 | Kemer et al. |
| 7,163,090 B2 | 1/2007 | Huber, Jr. |
| 7,377,370 B2 | 5/2008 | Huber, Jr. |

FOREIGN PATENT DOCUMENTS

CA       2502129       11/2005

OTHER PUBLICATIONS

International Search Report Form PCT/ISA/220, International Application No. PCT/US2015/047867, pp. 1-10, Dated May 20, 2016.

*Primary Examiner* — Melanie Torres Williams
(74) *Attorney, Agent, or Firm* — David L. Nocilly; Bond, Schoeneck & King, PLLC

(57) ABSTRACT

A sequencing valve for an automatic parking brake. The sequencing valve has a housing with a first port for communication with a source of a brake pipe pressure, a second port for communication with an exhaust, and a third port for communication with a brake pipe pressure input of an automatic parking brake. A valve body in the housing is moveable to either isolate the brake pipe pressure from the input to the parking brake, or couple brake pipe pressure to the input so that the parking brake may be released. A pilot is interconnected to the valve body for moving the valve body from the first position to the second position and can be driven by a charging and partial release of brake pipe pressure, charging of brake cylinder pressure, or a pneumatic signal provided by an electrical or a pneumatic control valve.

15 Claims, 20 Drawing Sheets

SEQUENCE VALVE FOR A BRAKE CYLINDER HAVING AN AUTOMATIC PARKING BRAKE

BACKGROUND OF THE INVENTION

1. Field of the Invention

The present invention relates to automatic parking brakes and, more particularly, to a sequencing valve that prevents release of an automatic parking brake until the braking system is fully charged and, in some cases, a subsequent brake application is made.

2. Description of the Related Art

In order to avoid having to manually apply the brake on each rail car in a train to accomplish a parking brake function, automatic parking brakes having been developed that automatically retain the brake cylinder in a fully applied position if the brake pipe pressure is exhausted below a predetermined threshold. For example, a locking mechanism responsive to brake pipe pressure may be included within a body mounted brake cylinder to prevent the push rod from returning to the brakes released position and a locking mechanism response to brake pipe pressure may be positioned on the exterior of a truck mounted brake cylinder to prevent the piston from returning to the brakes releases position. Because the development of brake pipe pressure releases the locking mechanism when the threshold is exceeded, it is possible that the parking brake will be released, thereby allowing the rail car to roll, before a normal brake application can be applied to hold the train in place. Accordingly, there is a need for a system that will prevent the automatic parking brake from releasing the rail car into a potential rolling situation until a normal brake application is possible or actually applied.

BRIEF SUMMARY OF THE INVENTION

The present invention comprises a sequencing valve for an automatic parking brake. The sequencing valve includes a housing having a first port for communication with a source of a brake pipe pressure, a second port for communication with an exhaust, and a third port for communication with a brake pipe pressure input of an automatic parking brake. A valve body in the housing is moveable between a first position, wherein the first port is isolated and the second port and the third port are coupled, and a second position, wherein the second port is isolated and the first port and third port are coupled. A pilot is interconnected to the valve body for moving the valve body from the first position to the second position. A spring biases the valve body into the first position and the pilot is configured to move the valve body from the first position to the second position against the bias of the spring after brake pipe pressure has been fully charged and then partially released.

In one embodiment, the pilot comprises a piston positioned in a chamber having a first inlet on a first side of the piston that is coupled to a source of brake pipe pressure via a choke and second inlet on a second side of the piston that is coupled directly to a source of brake pipe pressure. The piston is interconnected to the valve body by a stem to move the valve body into the second position when the pressure on the first side of the piston exceeds the pressure on the second side of the piston. In another embodiment, the pilot is configured to move the valve body from the first position to the second position after brake cylinder pressure has been fully charged. In an additional embodiment, wherein the pilot is configured to move the valve body from the first position to the second position in response to pneumatic pressure supplied by a control valve.

The pilot may also comprise a diaphragm positioned between a first chamber in direct communication with a source of brake pipe pressure a second chamber in communication with a source of brake pipe pressure via a choke. A bead seat having a passage in communication with the valve body is opened and closed by the diaphragm to selectively allow brake pipe pressure to act against the valve body. The diaphragm opens the passage in the bead seat after brake pipe pressure has been fully charged and then partially released.

The method of sequencing an automatic parking brake according to the present invention begins by providing a valve having a first port for communication with a source of a brake pipe pressure, a second port for communication with exhaust, and a third port for communication with a brake pipe pressure input of an automatic parking brake and a valve body moveable between a first position, wherein the first port is isolated and the second port and the third port are coupled, and a second position, wherein the second port is isolated and the first port and third port are coupled. The valve body is then piloted from the first position to the second position to couple brake pipe pressure to the brake pipe pressure inlet of the automatic parking brake.

The step of piloting of the valve body may comprise the steps of applying brake pipe pressure to a first side of a piston via a choke and to a second side of the piston directly and then releasing the brake pipe pressure from the second side of the piston so that the piston moves and forces the valve body into the second position. The step of piloting of the valve body can also comprise the step of applying brake cylinder pressure directly to the first side of a piston and to a second side of the piston via a choke so that the piston moves in response to brake cylinder pressure and forces the valve body into the second position. The step of piloting of the valve body can additionally comprise the step of applying pneumatic pressure from a control valve to first side of a piston and coupling an exhaust to a second side of the piston so that the piston moves in response to pressure supplied by the control valve and forces the valve body into the second position. The step of piloting of the valve body can further comprise the steps of applying brake pipe pressure directly to a first side of a diaphragm and to a second side of the diaphragm via choke directly and then releasing the brake pipe pressure from the first side of the diaphragm so that the diaphragm opens a passage that allows brake pipe pressure to force the valve body into the second position.

BRIEF DESCRIPTION OF THE SEVERAL VIEWS OF THE DRAWING(S)

The present invention will be more fully understood and appreciated by reading the following Detailed Description in conjunction with the accompanying drawings, in which.

DETAILED DESCRIPTION OF THE INVENTION

Figure 1:
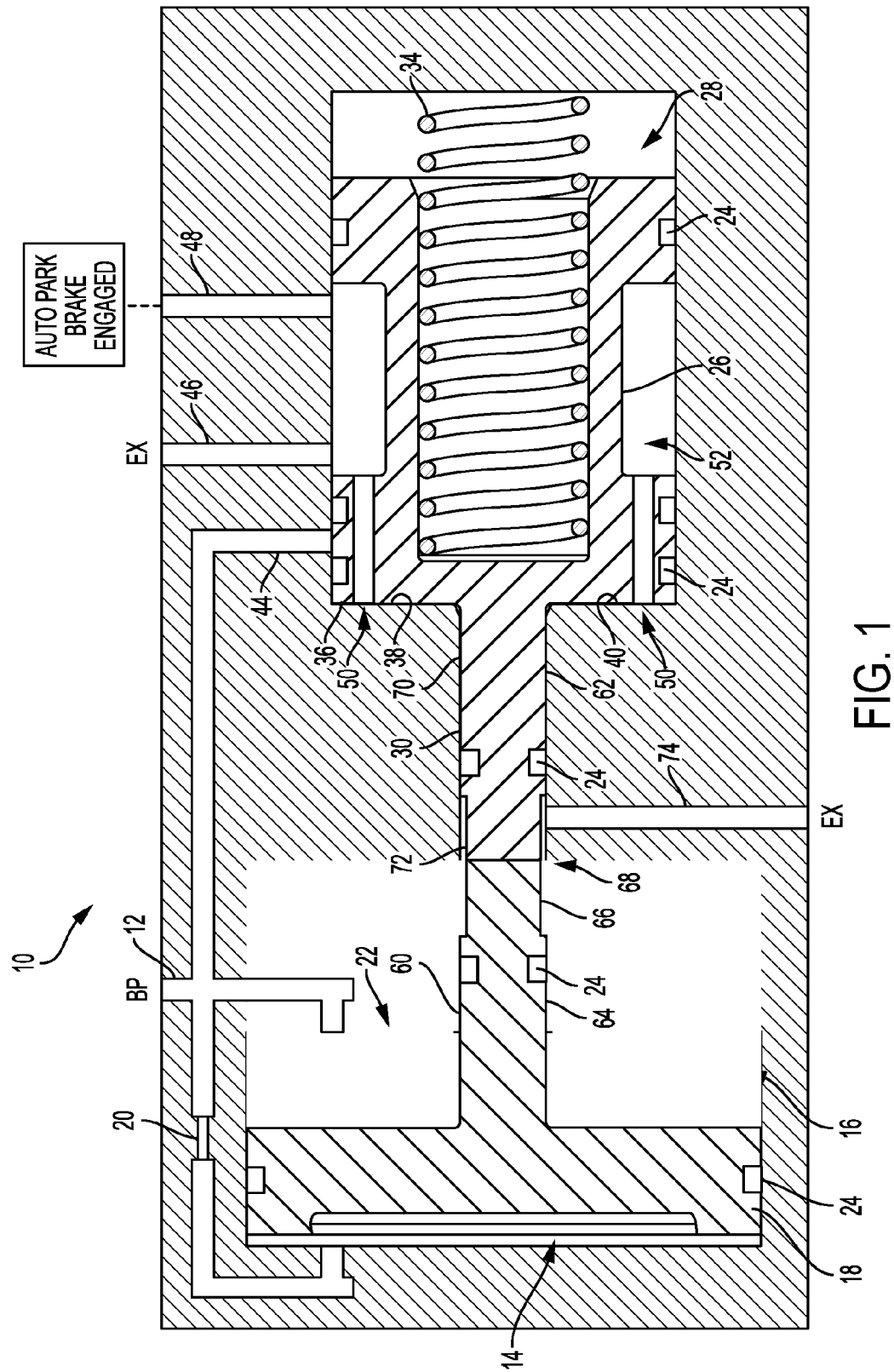
FIG. 1 is a schematic of a sequencing valve according to the present invention when brake cylinder pressure is zero and brake pipe pressure is zero.

Referring now to the drawings, wherein like reference numerals refer to like parts throughout, there is seen in FIG. 1 an automatic parking brake sequencing valve 10 for preventing the release of an automatic parking brake, such as the PARKLOC parking brake available from New York Air Bake LLC of Watertown, N.Y., until a subsequent normal brake application is made. Valve 10 may be provided in a separate housing attached to a brake cylinder, integrated into a brake cylinder, or within the brake pipe line, or attached to a control valve. In an automatic parking brake, a locking mechanism is engaged and retains the brake cylinder in the applied position until a threshold level of brake pipe pressure is developed and applied to the locking mechanism. Valve 10 is used to prevent the locking mechanism from disengaging and releasing the brake cylinder from the applied position until a brake application is commanded by the braking system, i.e., the brake pipe is fully charged and is then reduced as part of a braking command.

More specifically, valve 10 comprises an inlet 12 in communication with a source of brake pipe BP pressure. Inlet 12 is in communication with a first side 14 of a chamber 16 having a piston 18 positioned therein that is responsible to brake pipe BP pressure supplied by inlet 12. An orifice 20 is positioned inline between inlet 12 and first side 14 of chamber 16 to delay the accumulation and release of brake pipe BP pressure in first side 14 of chamber 16. Inlet 12 is also in direct communication with a second side 22 of chamber 16 so that brake pipe BP pressure is provided to the opposing side of piston 18 without a delaying orifice. It should be recognized by those of skill in the art that valve 10 may include any number of sealing rings 24 positioned at appropriate locations in and about valve 10 to ensure proper pneumatic isolation and smooth movements of the various elements of valve 10.

Piston 18 is interconnected to a valve body 26 positioned in a valve body chamber 28 via a two stage stem 30 that extends through a cylindrical passage 32 to engage valve body 26 positioned in valve body chamber 28. Piston 18 and chamber 16 thus serve as a pilot for valve body 26. A spring 34 positioned in valve body chamber 28 biases valve body 26 toward piston 18 until a shoulder 36 of the head 38 of valve body 26 contacts a wall 40 defining one end of valve body chamber 28. Valve body 26 is moveable within valve body chamber 28 to control communication between a first port 44 in communication with inlet 12 for receiving brake pipe BP pressure, a second port 46 in communication with exhaust EX, and a third port 48 coupled to the brake pipe BP pressure input of the locking mechanism of an automatic parking brake. Valve body 26 further includes one or more passages 50 extending from head 38 through valve body 26 into communication with a cavity 52 formed around the middle of valve body 26 proximately to second port 46 and third port 48. Thus, movement of valve body 26 can selectively control communication between the source of brake pipe BP pressure, exhaust EX, and the brake pipe BP pressure input of the locking mechanism of an automatic parking brake so that valve 10 will control how and when a source of brake pipe BP pressure is placed in communication with the locking mechanism.

Two stage stem 30 has a first section 60 secured to piston 18 and a second, separable section 62 secured to valve body 26 so that first section 60 and second section 62 may separate if piston 18 is biased away from valve body 26 farther than valve body 26 can travel due to contact with wall 40. First section 60 of stem 30 includes a wide portion 64 positioned proximately to piston 18 and having a diameter that fits snugly within passage 32. Wide portion 64 is separated by O-ring 24 from a narrow portion 66 having a smaller diameter to form a gap 68 between stem 30 and passage 32. Second section 62 of stem 30 also includes a wide portion 70 positioned proximately to valve body 26 and having a diameter that fits snugly within passage 32. Wide portion 70 of second section 62 is separated by O-ring 24 from a narrow portion 72 having a smaller diameter in communication with gap 66. Gap 66 is in communication with a port 74 connected to exhaust EX so that sections 60 and 62 can separate and rejoin more easily.

Valve 10 is shown in FIG. 1 in its position where the brake cylinder and brake pipe are unpressurized. Consequently, the locking mechanism of the automatic parking brake is in the engaged position. As the brake cylinder is not in the pressurized position, the locking mechanism is not providing an automatic parking brake force.

Figure 2:
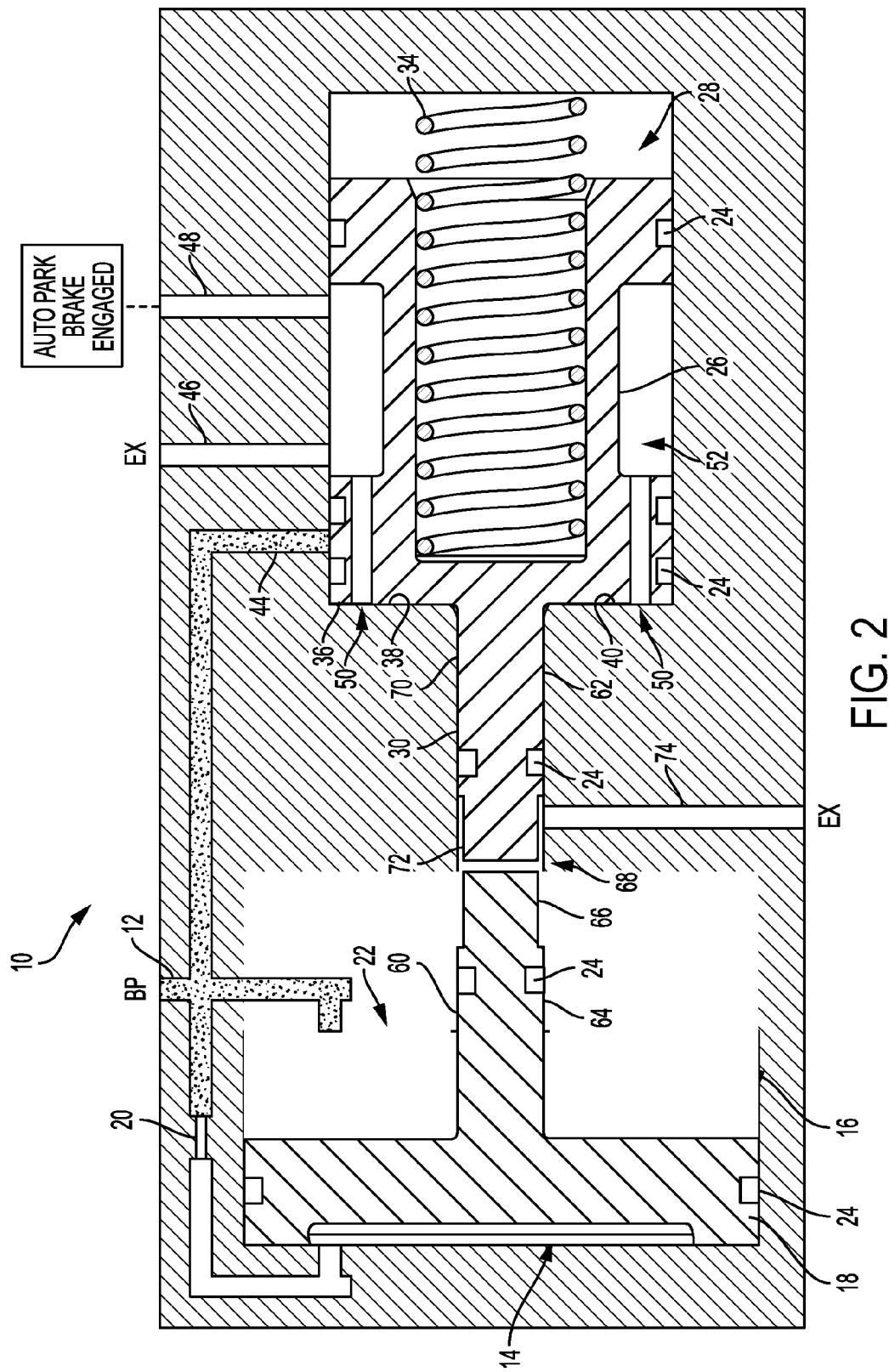
FIG. 2 is a schematic of a sequencing valve according to the present invention where brake pipe pressure has recently charged to full pressure.

Referring to FIG. 2, an initial charging of brake pipe BP pressure will result in an imbalance of pressure in chamber 16 due to the differential rate of brake pipe BP pressure being supplied to first side 14 and second side 22. As a result, piston 18 will move toward the first side 14 of chamber 16 because orifice 20 restricts the flow of brake pipe BP pressure into first side 14 of chamber 16. As valve body 26 cannot travel as far as piston 18, first section 60 and second section 62 of stem 30 physically separate. Due to spring 34, valve body 26 remains in a position where first port 44 is in communication with brake pipe BP pressure and is isolated from third port 48, and third port 48 is coupled to exhaust via inlet 46.

Figure 3:
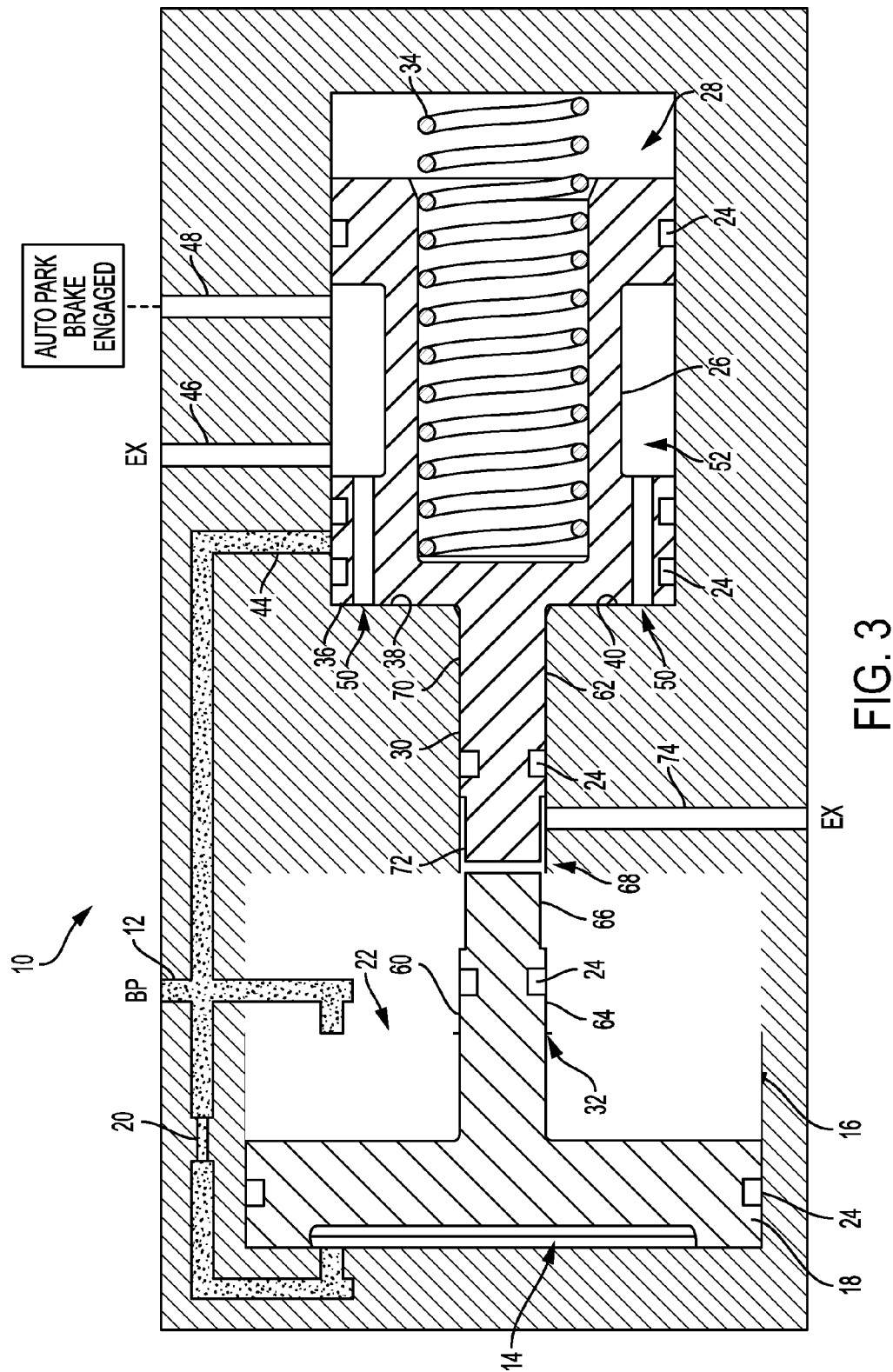
FIG. 3 is a schematic of a sequencing valve according to the present invention where brake pipe pressure has charged to full pressure sufficiently for the sequencing valve to reach brake pipe pressure equilibrium.

Referring to FIG. 3, brake pipe BP pressure will eventually reach equilibrium in chamber 16 as orifice 20 allows first side 14 of chamber 16 to fully charge. As piston 18 is not biased other than by pressure in first side or second side of chamber 16, valve 10 will remain in the configuration seen in FIG. 2. Valve body 26 remains in a position where first port 44 in communication with brake pipe BP pressure is isolated from third port 48, and third port 48 is coupled to exhaust via port 46.

Figure 4:
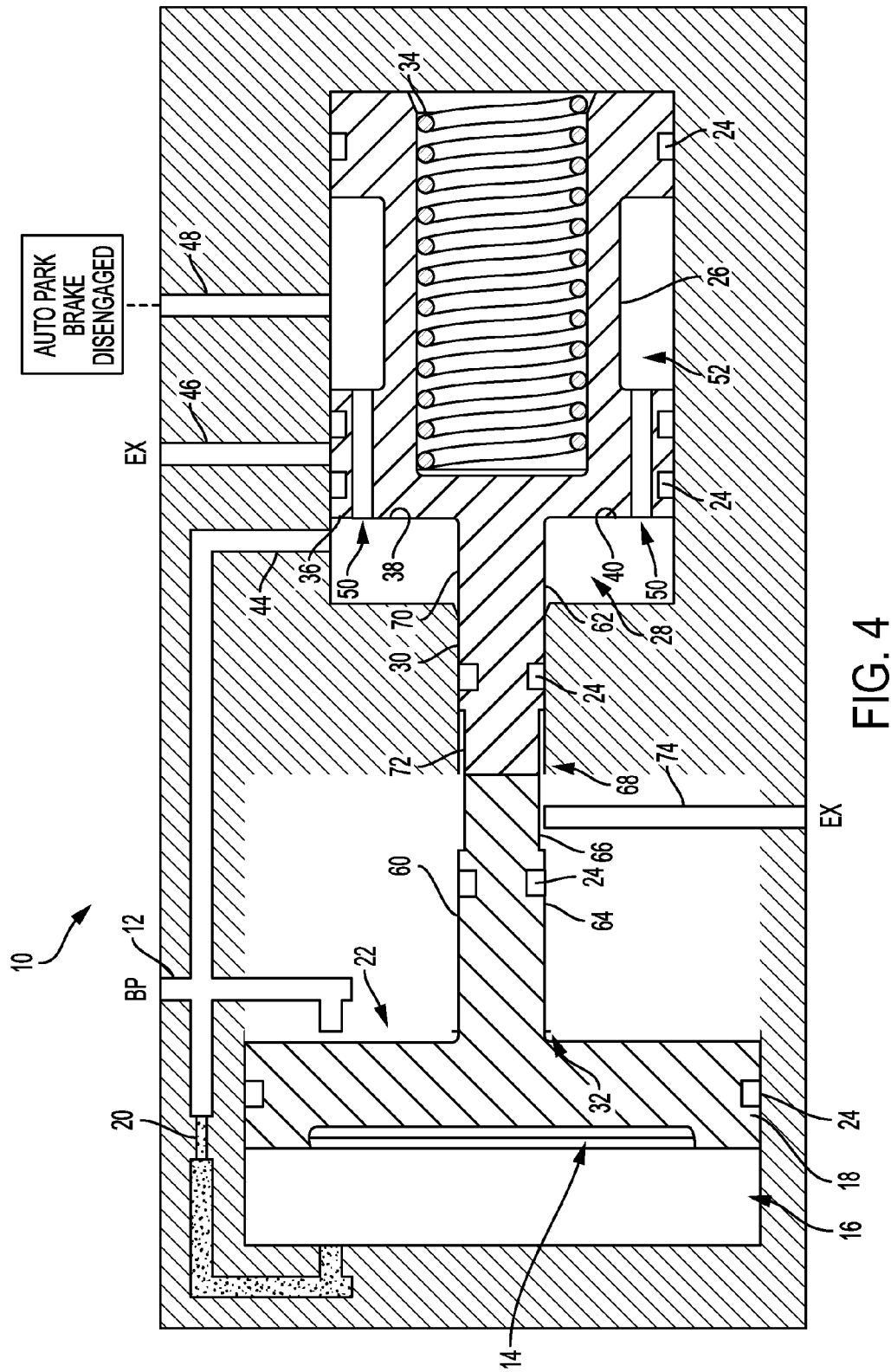
FIG. 4 is a schematic of a sequencing valve according to the present invention during service brake application where brake pipe pressure has been recently reduced.
Figure 5:
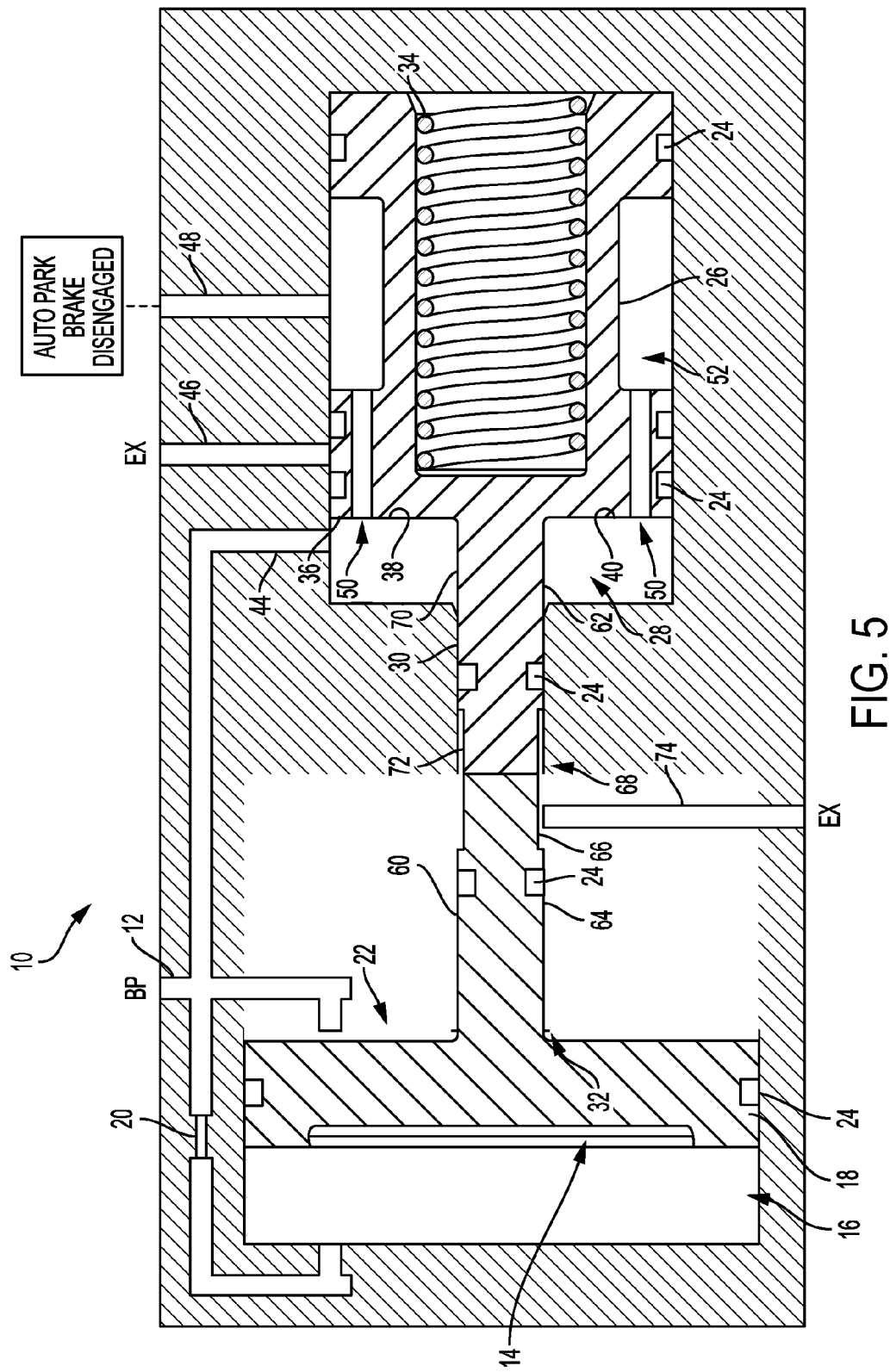
FIG. 5 is a schematic of a sequencing valve according to the present invention during service brake application where brake pipe pressure has been reduced and sequencing valve has reached brake pipe pressure equilibrium.

Referring to FIG. 4, a reduction in brake pipe BP pressure associated with a service brake application will remove pressure from second side 22 of chamber 16 faster than first side 14 of chamber 16 because of orifice 20. Piston 18 will therefore be pushed toward second side 22 of chamber 16, causing first section 60 and second section 62 of stem 30 to reengage and then move valve body 26 against the bias of spring 34 into a second position. In this position, valve body 26 places first port 44 in communication with third port 48 via passages 50 so that brake pipe BP pressure is provided to the locking mechanism of the automatic parking brake. Valve body 26 also blocks second port 46 in this position so that the exhaust EX is isolated. As seen in FIG. 5, even when the pressure in chamber 16 is no longer imbalanced, valve body 26 will remain in the second position because brake pipe BP pressure supplied through first port 44 acts against head 38 of valve body 26 to overcome the bias of spring 34.

Figure 6:
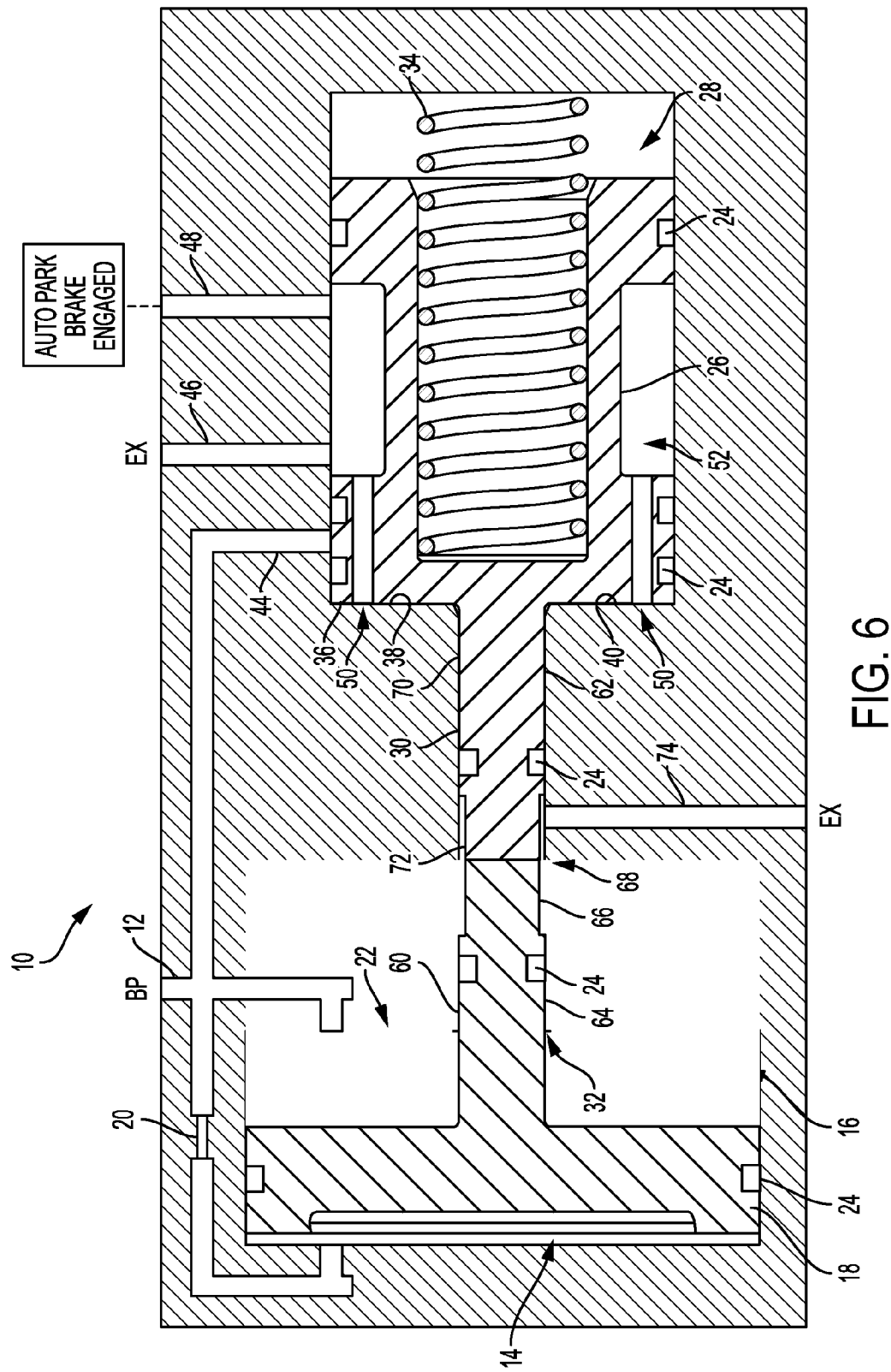
FIG. 6 is a schematic of a sequencing valve according to the present invention during an emergency brake application.
Figure 7:
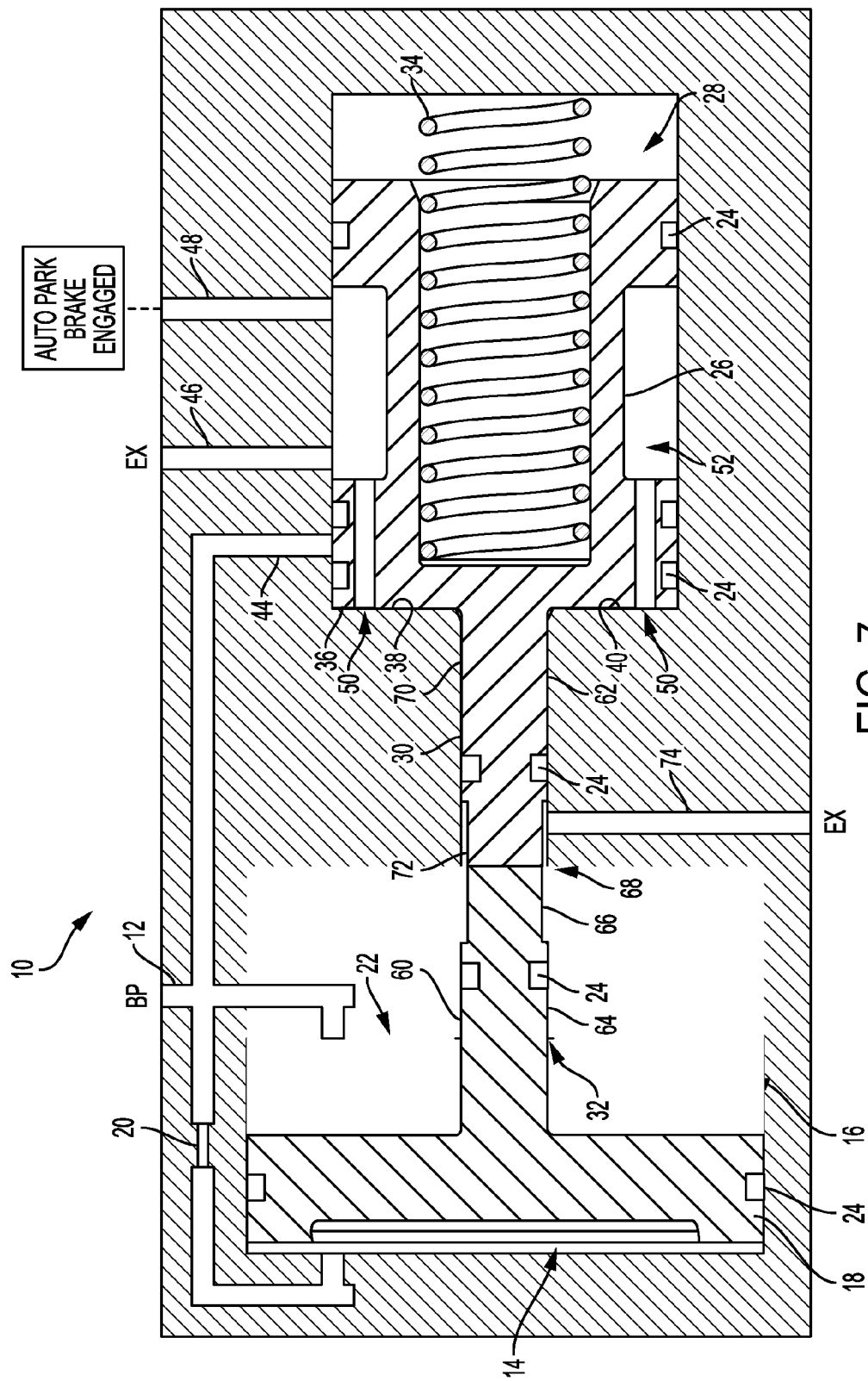
FIG. 7 is a schematic of a sequencing valve according to the present invention after an emergency brake application and brake cylinder pressure has been exhausted.

Referring to FIG. 6, during an emergency brake application where brake pipe BP pressure is vented to zero and brake cylinder pressure is at the maximum, valve 10 will remain in the position seen in FIG. 1. In this position, valve body 26 has placed third port 48 in communication with exhaust EX of second port 46, and third port 48 is isolated from first port 44. Due to the lack of brake pipe BP pressure, the locking mechanism of the automatic parking brake will be engaged and will retain the brake cylinder in the fully applied position. Referring to FIG. 7, even if brake cylinder pressure is exhausted to zero, valve body 26 will remain in the position of FIG. 6 and third port 48 will stay in communication with exhaust EX so that the locking mechanism of the automatic parking brake will remain engaged.

Figure 8:
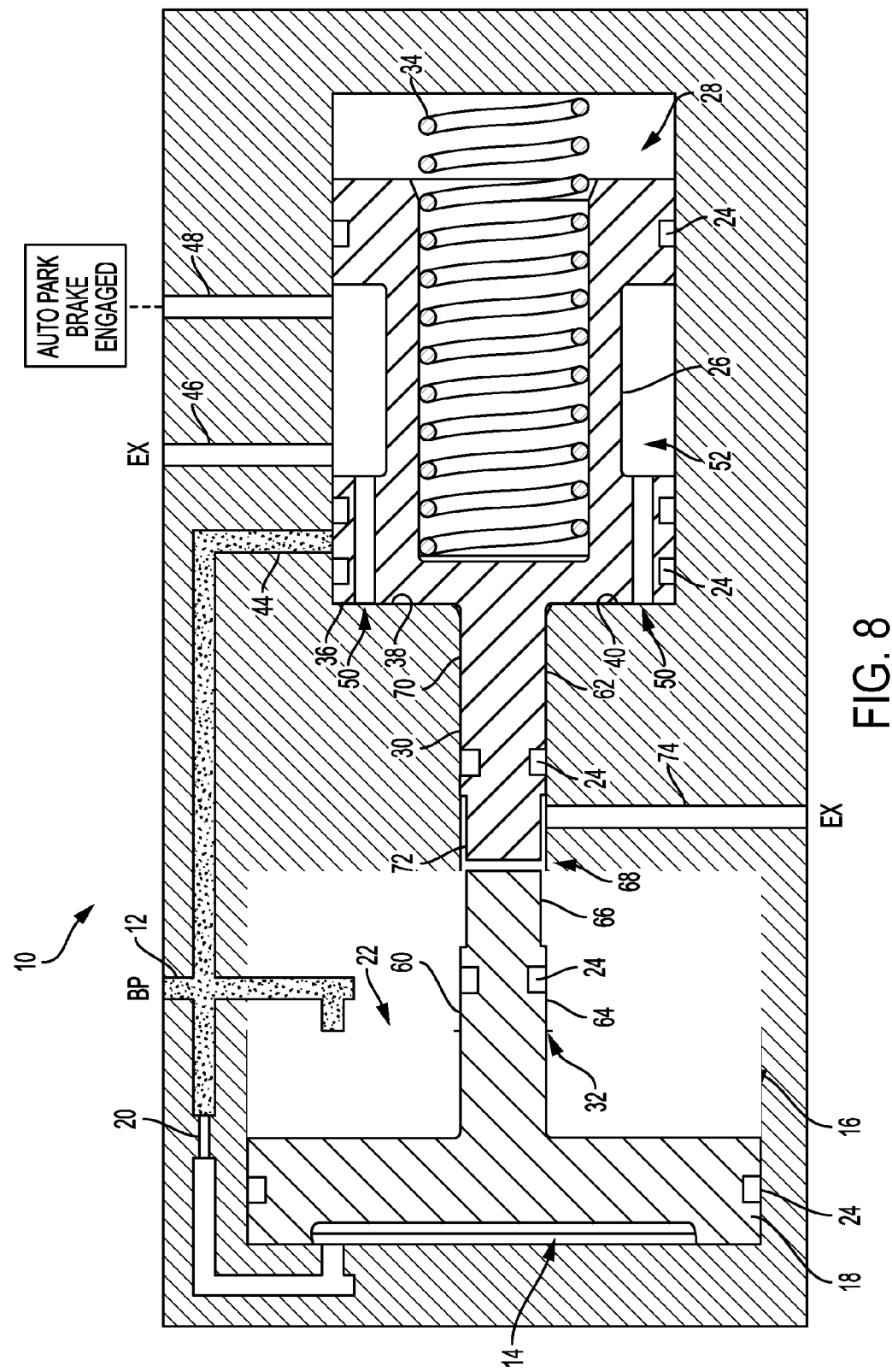
FIG. 8 is a schematic of a sequencing valve according to the present invention after the brake pipe pressure has been restored and the sequencing valve has not yet reached brake pipe pressure equilibrium.
Figure 9:
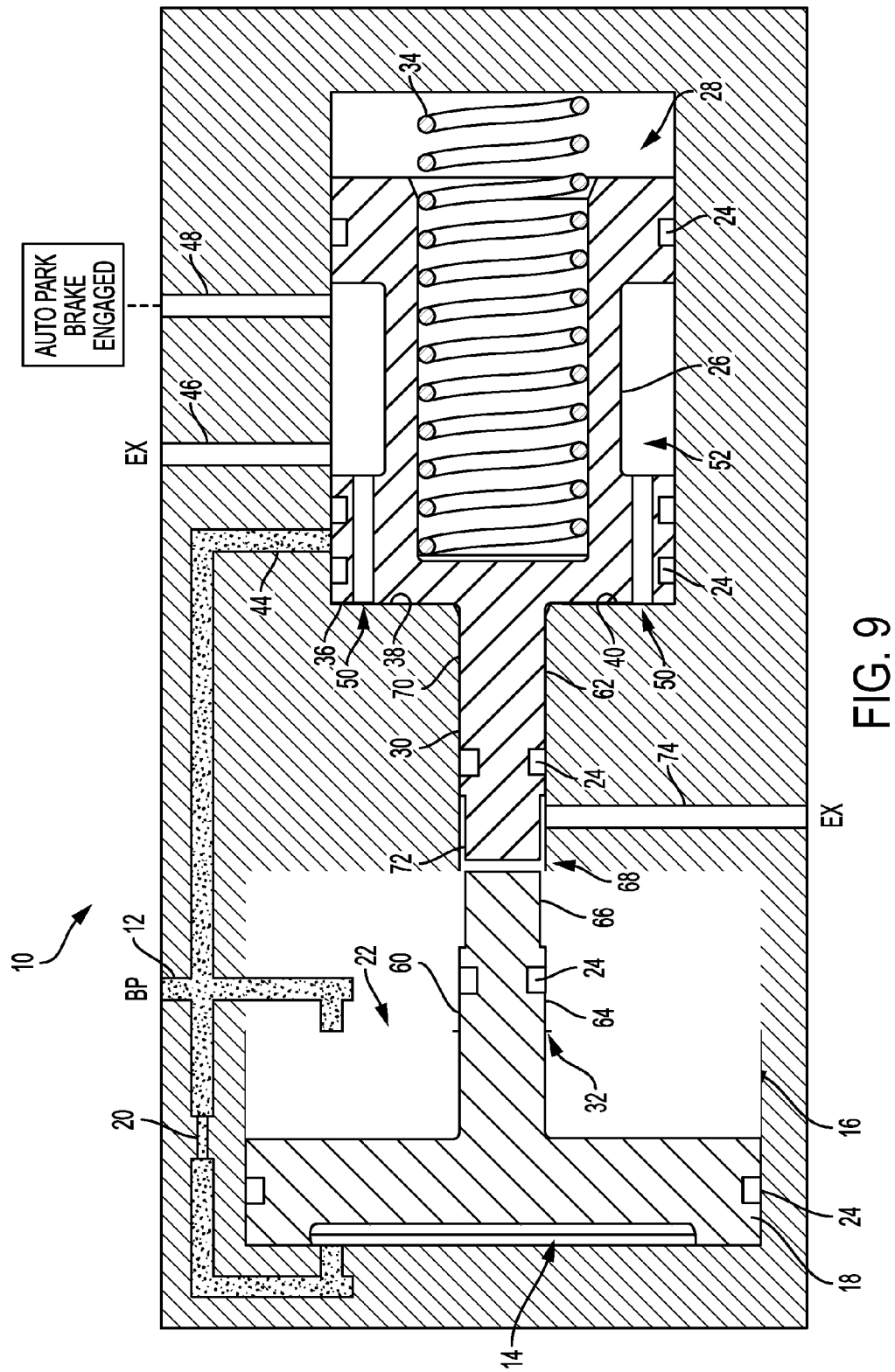
FIG. 9 is a schematic of a sequencing valve according to the present invention after the brake pipe pressure has been restored and the sequencing valve has reached brake pipe pressure equilibrium.

Referring to FIG. 8, a subsequent restoration of brake pipe BP pressure will initially cause piston 18 to move fully to first side 14 of chamber 16 so that the first and second sections 60 and 62 of stem 30 to separate, as previously seen in FIG. 2. Third port 48 remains in communication with exhaust EX via second port 46, so the locking mechanism of the automatic parking brake will remain engaged during the brake pipe BP pressure recharge. Similarly, as seen in FIG. 9, when the brake pipe is fully charged, valve 10 will remain in the same position as FIG. 8 so that the locking mechanism of the automatic parking brake will remain engaged, thereby providing maintaining the brake cylinder in the applied position so that the parking brake function remains in place.

Figure 10:
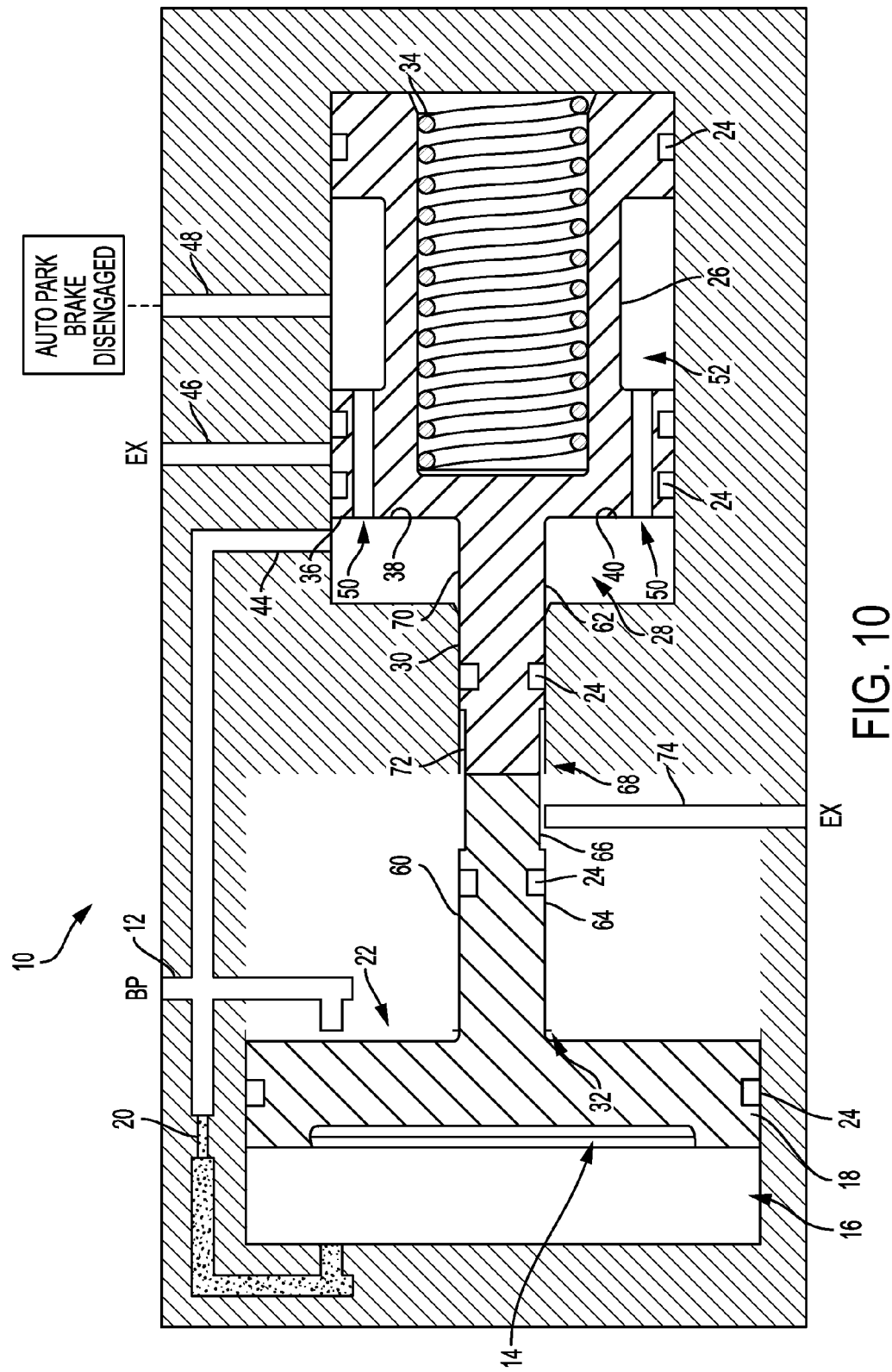
FIG. 10 is a schematic of a sequencing valve according to the present invention after a brake pipe pressure recharge and a subsequent service brake application before the sequencing valve has reached brake pipe pressure equilibrium.
Figure 11:
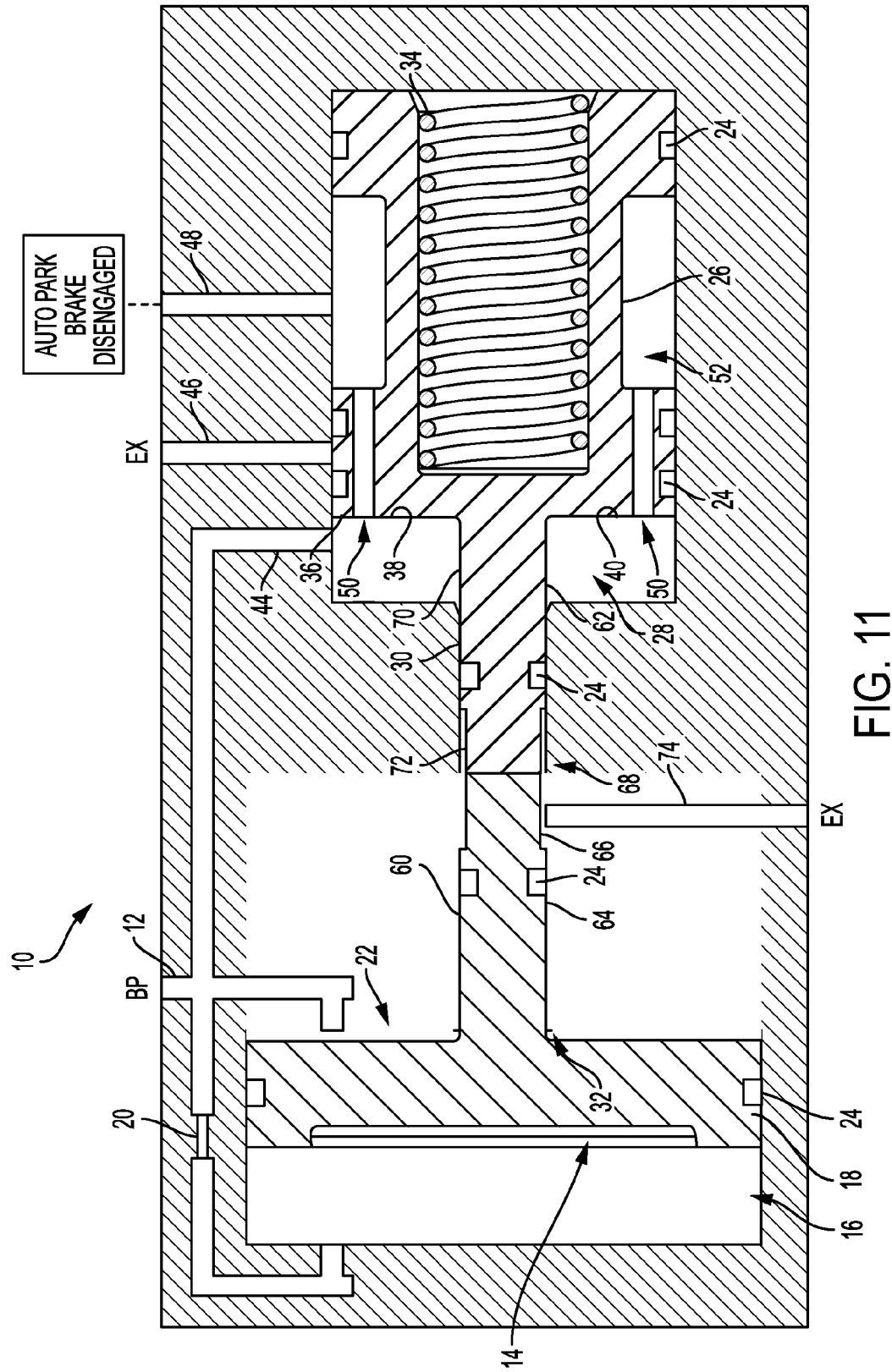
FIG. 11 is a schematic of a sequencing valve according to the present invention after a brake pipe pressure recharge and a subsequent service brake application after the sequencing valve has reached brake pipe pressure equilibrium.
Figure 12:
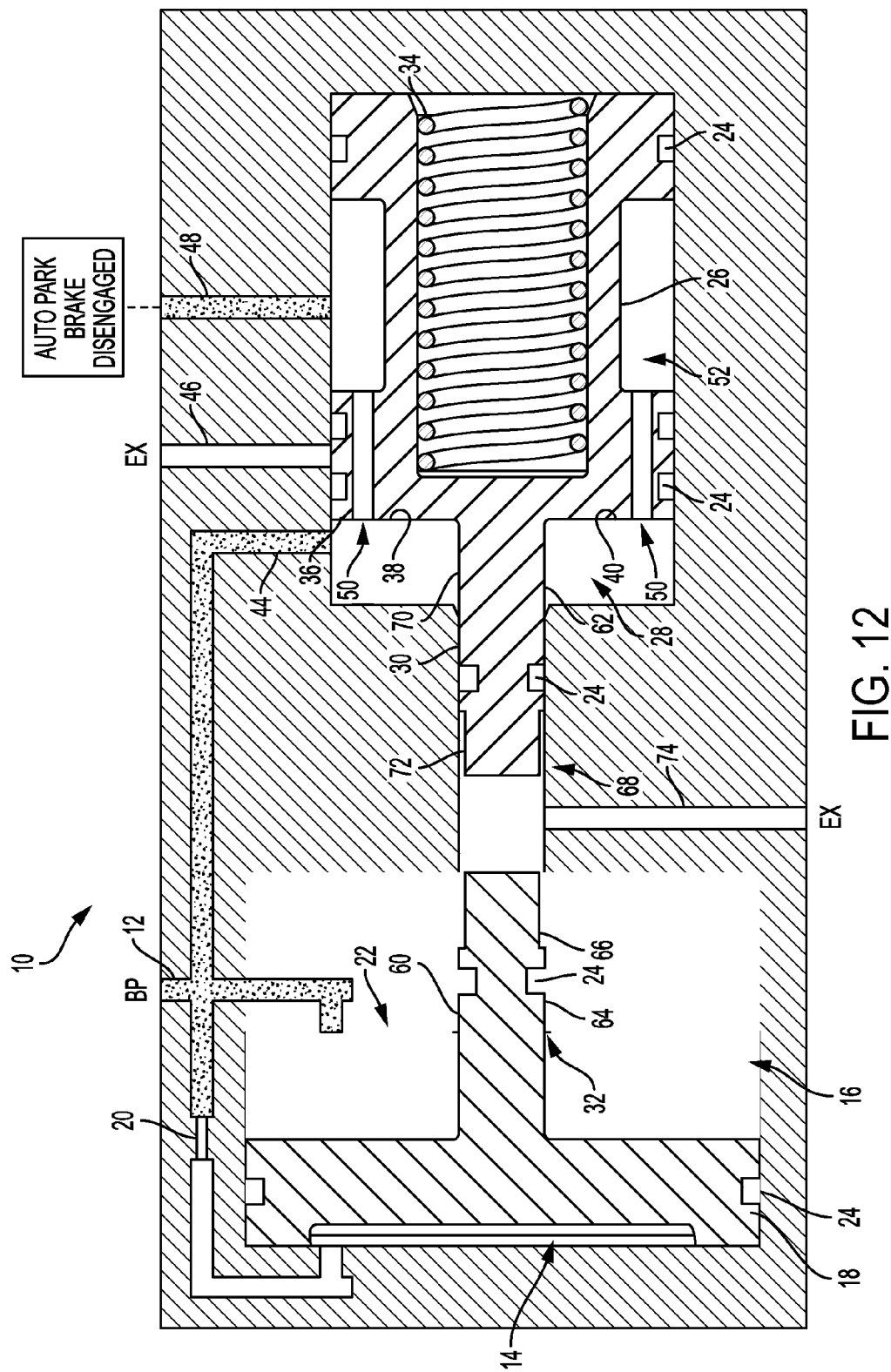
FIG. 12 is a schematic of a sequencing valve according to the present invention after the service brake application is released and the sequencing valve has not yet reached brake pipe pressure equilibrium.
Figure 13:
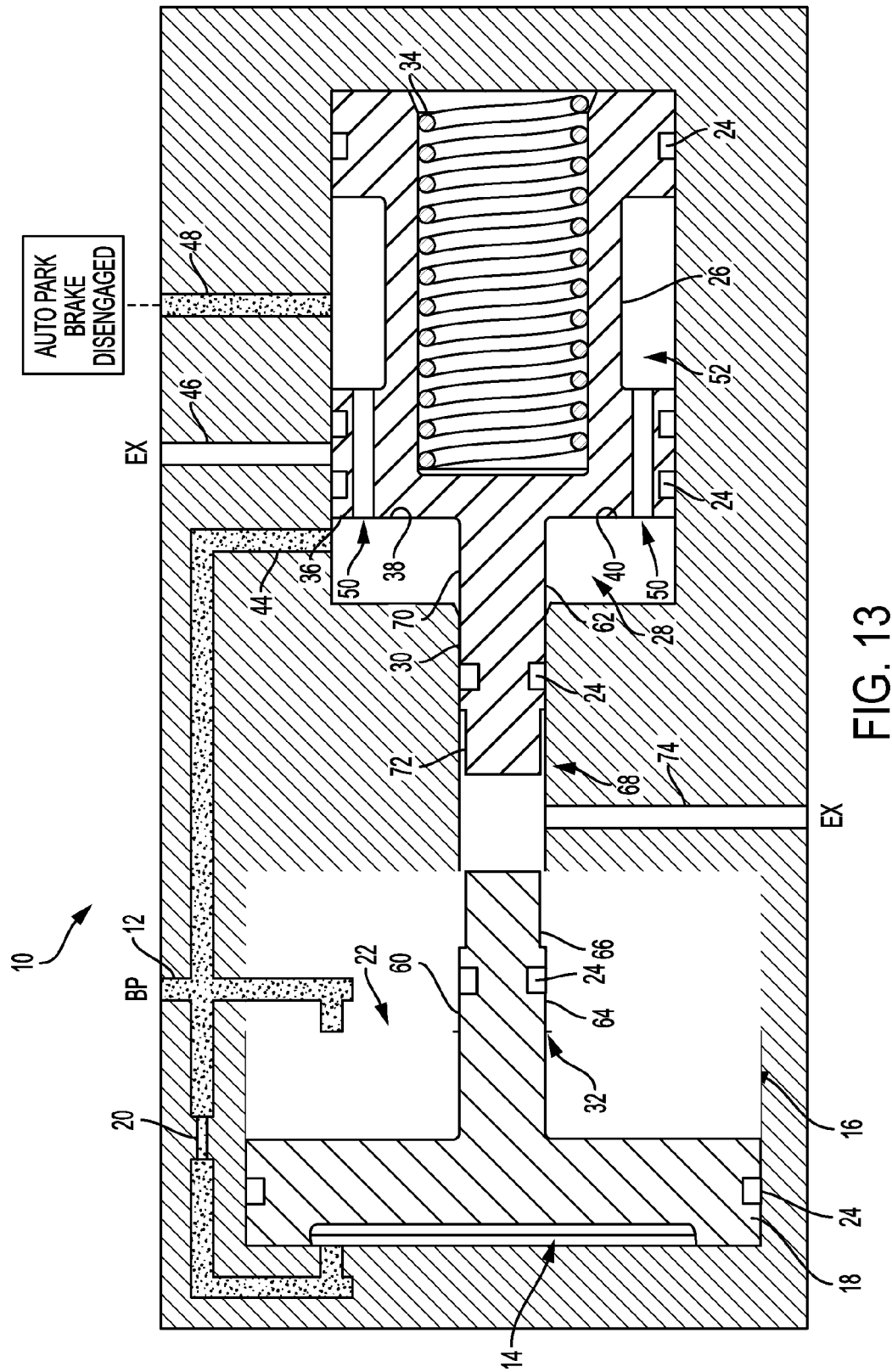
FIG. 13 is a schematic of a sequencing valve according to the present invention after the service brake application has been released and the sequencing valve has reached brake pipe pressure equilibrium.

Referring to FIG. 10, a brake pipe BP pressure reduction associated with a service brake application will cause piston 18 to move to second side 22 of chamber 16 and thus push valve body 26 into the second position where brake pipe BP pressure is supplied to third port 48 via passages 50. As a result, the locking mechanism will disengage, thereby releasing the automatic parking brake. Thus, valve 10 maintains the automatic parking brake through a full recharge of brake pipe BP pressure until a subsequent service brake application is made. As seen in FIG. 11, valve 10 will remain in the position of FIG. 10 where the automatic parking brake has been released even after the reduced brake pipe BP pressure in chamber 16 has equalized on both sides of piston 18. As seen in FIG. 12, when brake pipe BP pressure is restored, i.e., the service brake application has ended and brake cylinder pressure is released, piston 18 will separate from valve body 26 and the automatic parking brake will remain released. As seen in FIG. 13, valve 10 will remain in the position of FIG. 12 once brake pipe BP pressure equalizes across first chamber 16.

Figure 14:
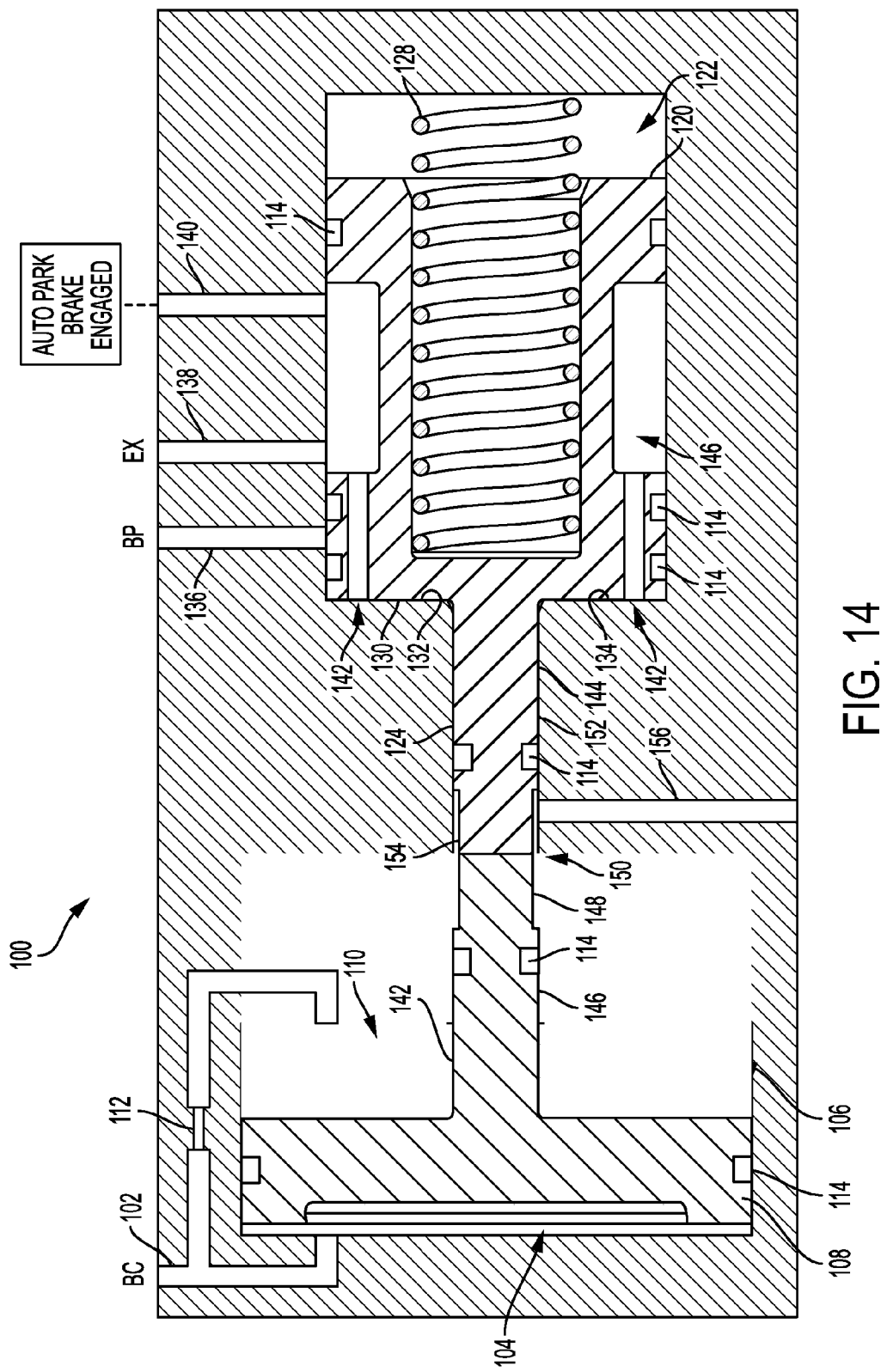
FIG. 14 is a schematic of another embodiment of a sequencing valve according to the present invention.

Referring to FIG. 14, a second embodiment of an automatic parking brake sequencing valve 100 comprises an inlet 102 in communication with a source of brake cylinder BC pressure. Inlet 102 is in direct communication with a first side 104 of a chamber 106 having a piston 108 positioned therein. Inlet 102 is also in communication with a second side 110 of chamber 106 via an orifice 112 to delay the accumulation of brake cylinder BC pressure in second side 110 of chamber 106. It should be recognized by those of skill in the art that valve 100 may include any number of sealing rings 114 positioned at appropriate locations in and about valve 100 to ensure proper pneumatic isolation and smooth movements of the various elements of valve 100.

Piston 108 is interconnected to a valve body 120 positioned in a valve body chamber 122 via a two stage stem 124 that extends through a cylindrical passage 126 to engage valve body 120 positioned in valve body chamber 122. Piston 108 and chamber 106 thus serve as a pilot for valve body 120. A spring 128 positioned in valve body chamber 122 biases valve body 120 toward piston 108 until a shoulder 130 of the head 132 of valve body 120 contacts a wall 134 defining valve body chamber 122. Valve body 120 is moveable within valve body chamber 122 to control communication between a first port 136 in communication with a source of brake pipe BP pressure, a second port 138 in communication with exhaust EX, and a third port 140 coupled to the brake pipe BP pressure input of the locking mechanism of an automatic parking brake. Valve body 120 further includes one or more passages 142 extending from head 132 through valve body 120 into communication with a cavity 146 formed around the middle of valve body 120 proximately to second port 138 and third port 140. Thus, movement of valve body 120 can selectively control communication between the source of brake pipe BP pressure, exhaust EX, and the brake pipe BP pressure input of the locking mechanism of an automatic parking brake so that valve 100 will control how and when a source of brake pipe BP pressure is placed in communication with the locking mechanism.

Two stage stem 124 has a first section 142 secured to piston 108 and a second, separable section 144 secured to valve body 120 so that first sections 142 and second section 144 may separate if piston 108 is biased away from valve body 120 farther than valve body 120 can travel due to contact with wall 134. First section 142 of stem 124 includes a wide portion 146 positioned proximately to piston 108 and having a diameter that fits snugly within passage 126. Wide portion 146 is separated by O-ring 114 from a narrow portion 154 having a smaller diameter to form a gap 150. Second section 144 of stem 124 also includes a wide portion 152 positioned proximately to valve body 120 and having a diameter that fits snugly within passage 126. Wide portion 152 of second section 144 is separated by O-ring 114 from a narrow portion 154 having a smaller diameter in communication with gap 150 between stem 124 and passage 120. Gap 150 is in communication with a port 156 connected to exhaust EX.

Valve 100 will respond to an increase in brake cylinder BC pressure to disengage the locking mechanism of the automatic parking brake. As a brake cylinder application cannot occur until the brake pipe BP pressure has been fully restored and then reduced to command a brake cylinder application, valve 100 will not allow the automatic parking brake to be released until after the brake pipe BP pressure has been restored and a subsequent service or emergency brake application has occurred.

Figure 15:
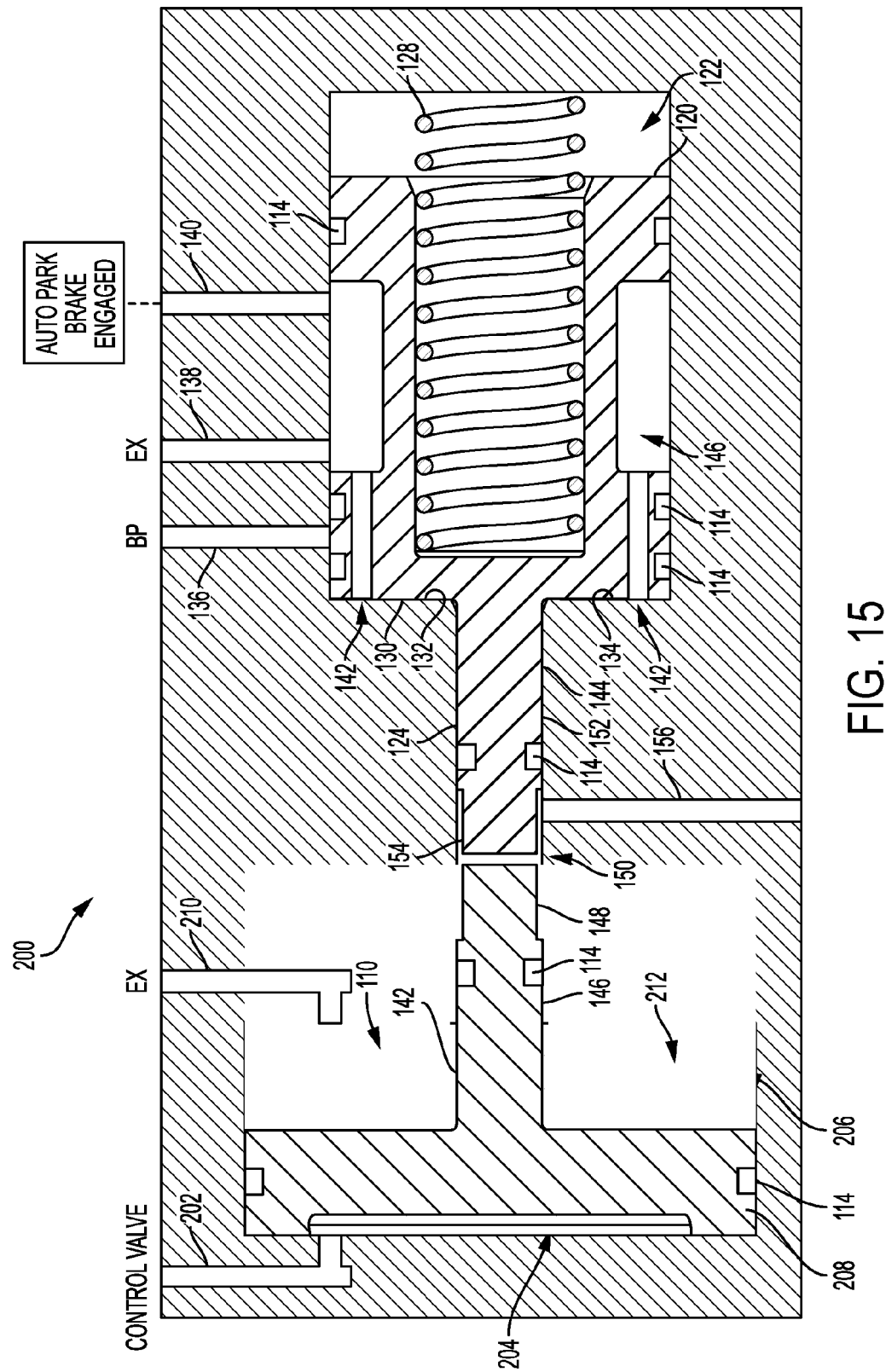
FIG. 15 is a schematic of a sequencing valve according to the present invention of a further embodiment according to the present invention.

Referring to FIG. 15, a third embodiment of an automatic parking brake sequencing valve 200 comprises an inlet 202 for communication with a braking system control valve. Inlet 202 is in direct communication with a first side 204 of a chamber 206 having a piston 208 positioned therein. A second inlet 210 is in communication with exhaust EX and a second side 212 of chamber 206. The remaining structure of valve 200 is the same as that of valve 100 so that piston 208 and chamber 206 serve as a pilot controlling whether the brake pipe pressure input of an automatic parking brake is connected to brake pipe BP pressure or to exhaust. Valve 200 is operable in response to a pneumatic signal provided by an electrical or pneumatic control valve, which can be programmed or configured to provide the pneumatic signal to valve 200 only after brake pipe BP pressure has been fully restored and a subsequent brake application has occurred as desired.

Figure 16:
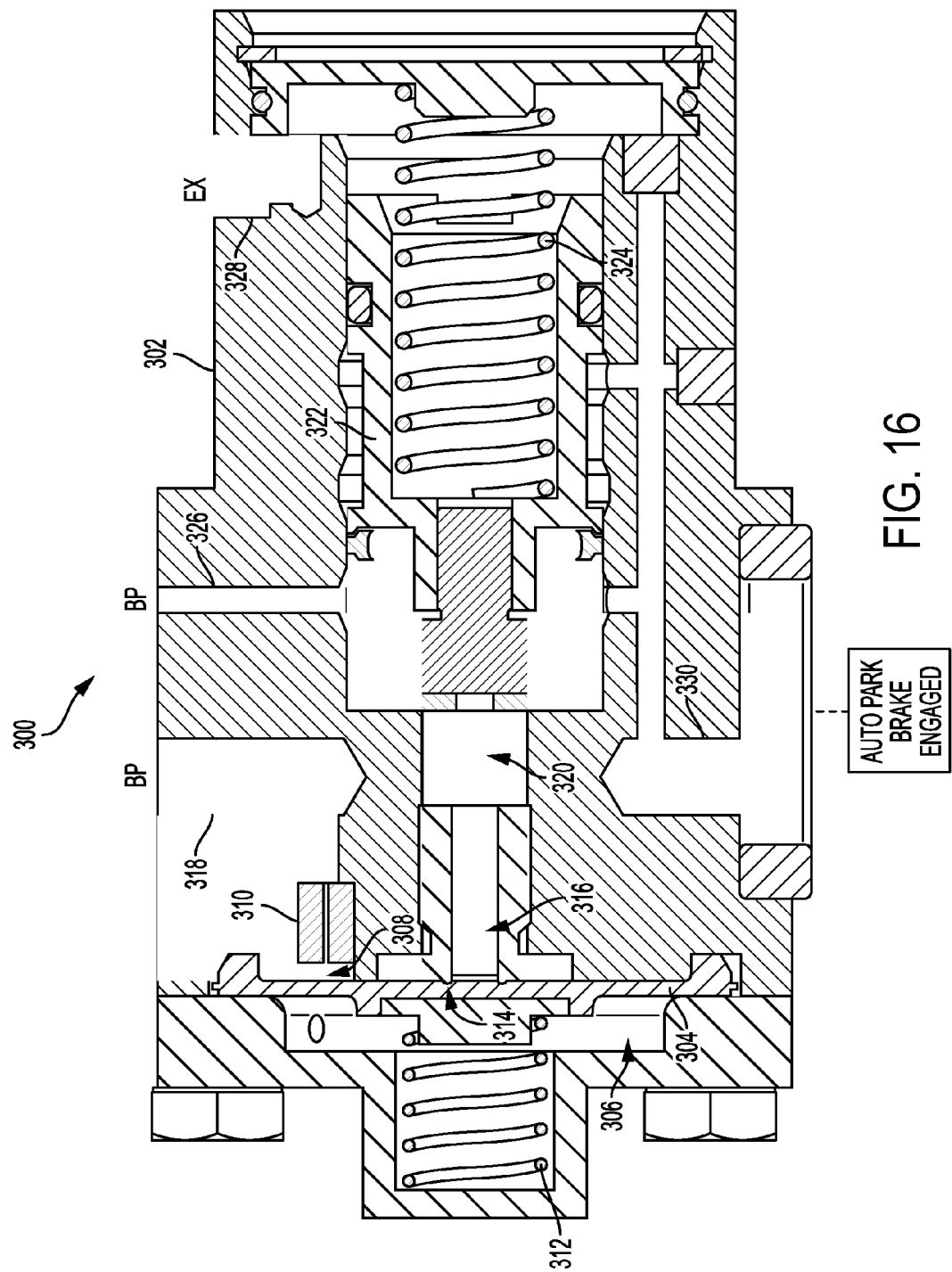
FIG. 16 is a schematic of an additional sequencing valve according to the present invention.

Referring to FIG. 16, a fourth embodiment of an automatic parking brake sequencing valve 300 comprises a housing 302 having a diaphragm 304 that separates a first chamber 306 in open communication with a source of brake pipe BP pressure from a second chamber 308 that is in communication with a source of brake pipe BP pressure via an orifice 310 via an inlet 318. Diaphragm 204 is biased toward second chamber 308 by a spring 312. A bead seat 314 provides for selective communication between second chamber 308 and a passage 316 positioned within bead seat 314 if diaphragm 304 moves away from the opening to passage 316 in beat seat 314. Passage 316 extends within housing 302 to a third chamber 320 having a piston 322 therein that operates like a valve body. Piston 322 is biased by a spring 324 toward passage 316 and, if diaphragm 304 separate from bead set 314, brake pipe BP pressure in second chamber 308 will flow through passage 316 to move piston 322 against the bias of spring 324. Thus, diaphragm 304 acts a pilot for the valve operations accomplished by piston 322. Third chamber 320 includes a first port 326 coupled to a source of brake pipe BP pressure, a second port 328 coupled to exhaust EX, and a third port 330 coupled to the brake pipe BP pressure inlet of the locking mechanism of an automatic parking brake. As seen in FIG. 16, when the braking system is uncharged and a brake application was not made prior to the exhausting of brake pipe BP pressure, i.e., both the brake pipe BP pressure and brake cylinder BC pressure are zero, the locking mechanism of an automatic parking brake will be engaged but the parking brake will not be applied. Valve 300 will remain in the position seen in FIG. 16 after brake pipe BP pressure has been restored to full pressure.

Figure 17:
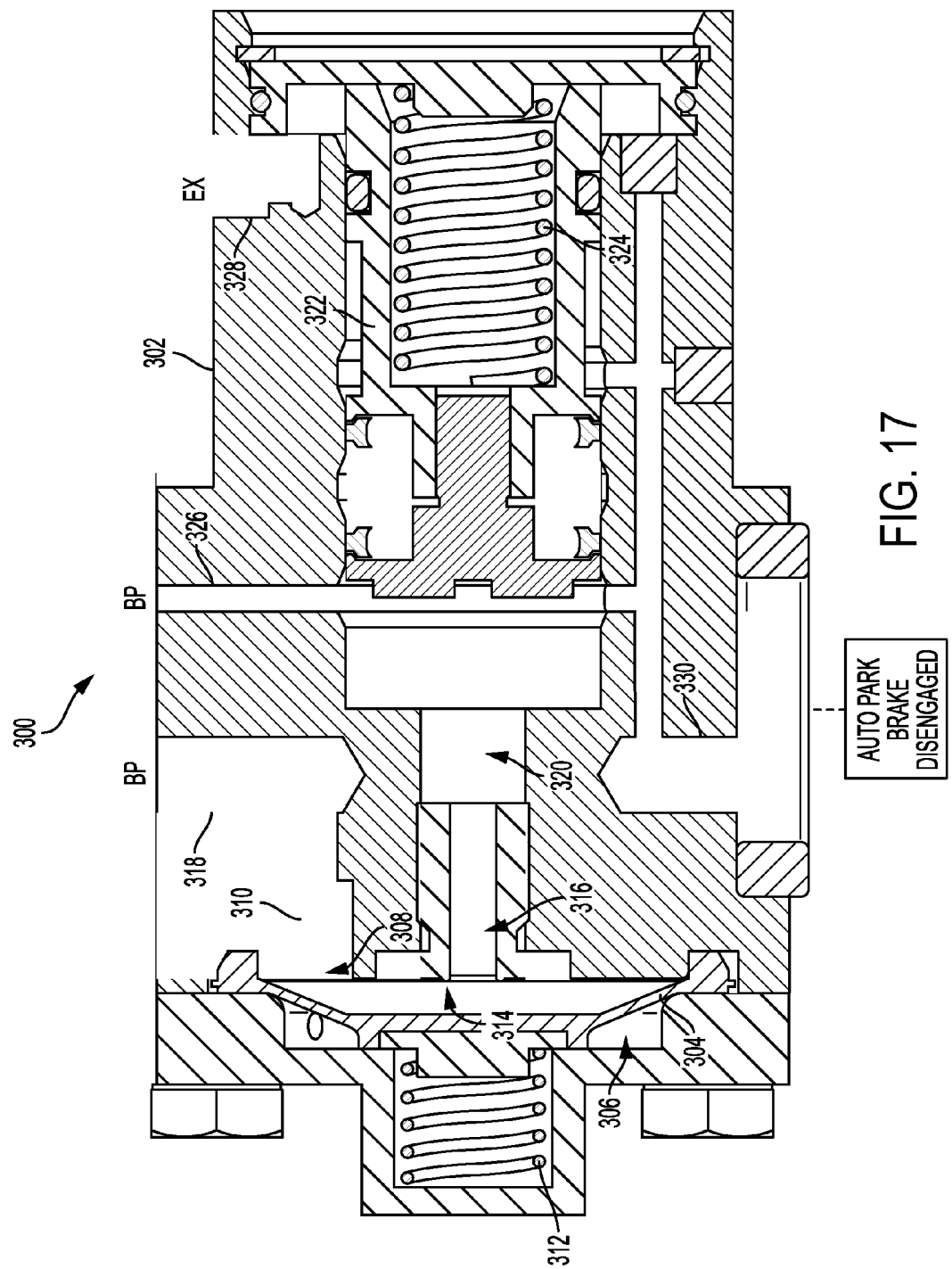
FIG. 17 is a schematic of the sequencing valve of FIG. 16 after brake pipe pressure has been charged and a service brake application is made.

Referring to FIG. 17, a service brake application will cause diaphragm 304 to separate from beat seat 314 as the pressure in first chamber 306 will be reduced before the pressure in second chamber 308 due to orifice 310. As a result, pressure in second chamber 308 can flow though passage 316 into chamber 320 and push piston 322 against the bias of spring 324. As a result of the movement of piston 322, first port 326 is placed into communication with third port 330, and third port 330 is isolated from second port 328. Brake pipe BP pressure from first port 326 will thus, via third port 330, cause locking mechanism to disengage, thereby releasing the parking brake.

Figure 18:
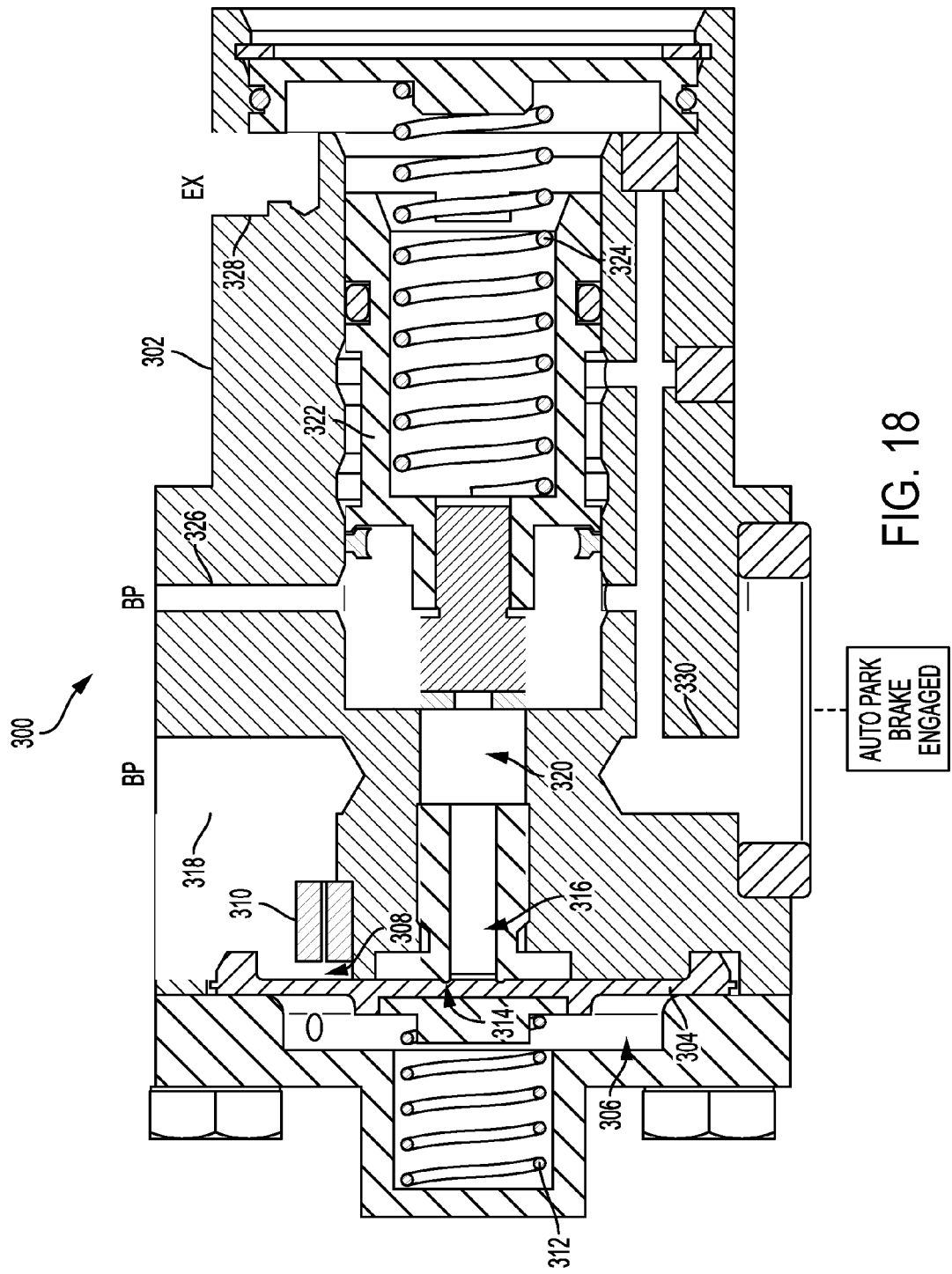
FIG. 18 is a schematic of the sequencing valve of FIG. 16 after an emergency brake application.

Referring to FIG. 18, an emergency brake application will not cause any change in the positioning of valve 300 as shown in FIG. 16, so the locking mechanism of the automatic parking brake will remain engaged due to its continued isolation from the source of brake pipe BP pressure. Valve 300 will also not change if the brake cylinder pressure is exhausted, so the locking mechanism of the automatic parking brake will remain engaged and the brake cylinders will be retained in the applied position by the parking brake. A subsequent recharging of brake pipe BP pressure will not cause any changes in valve 300, even after recharging is complete, so the locking mechanism will remain locked so that the parking brake applied to retain the brake cylinder in the brakes applied position.

Figure 19:
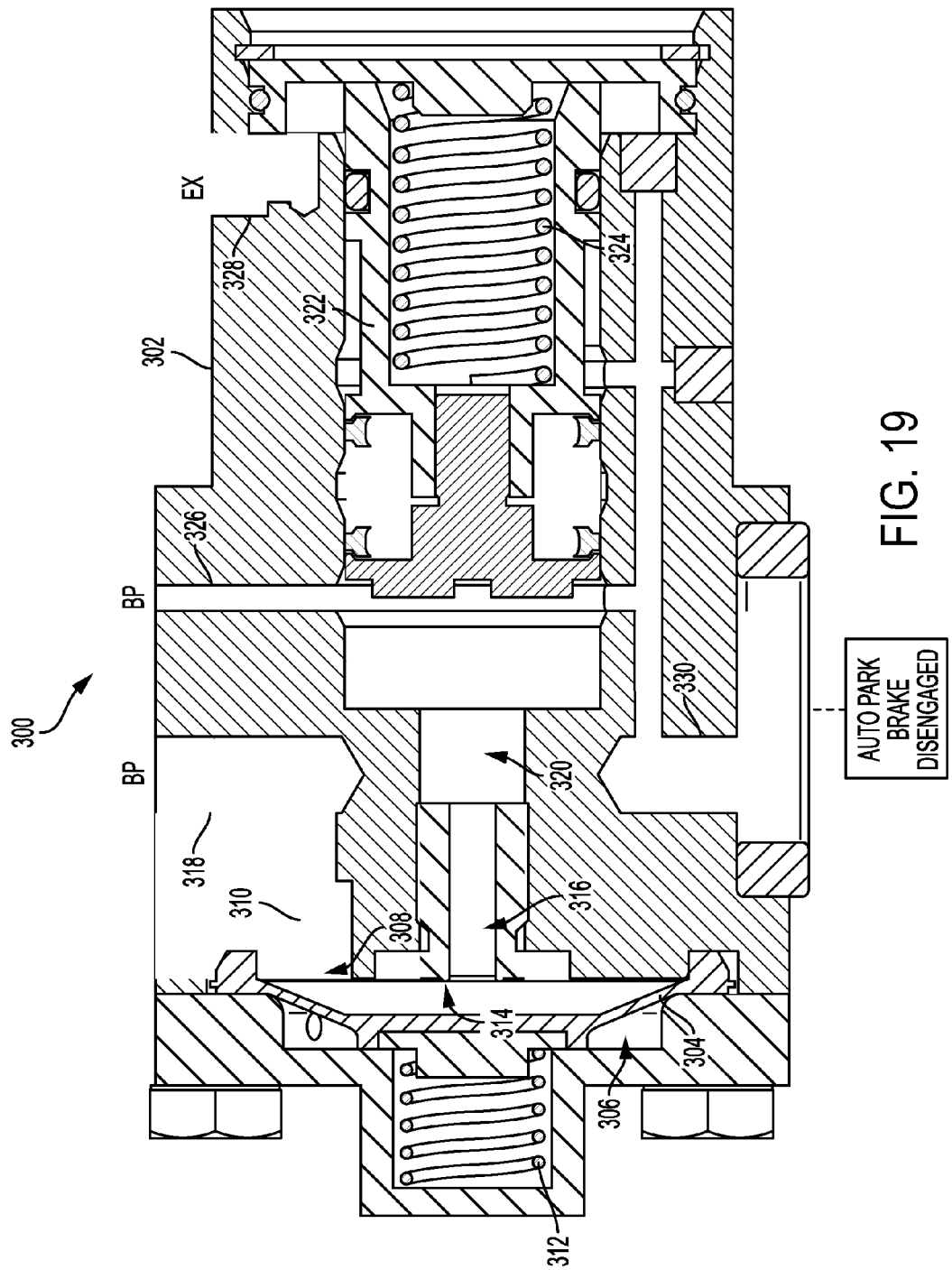
FIG. 19 is a schematic of the sequencing valve of FIG. 16 after brake pipe pressure has been charged then reduced and a service brake application is made.
Figure 20:
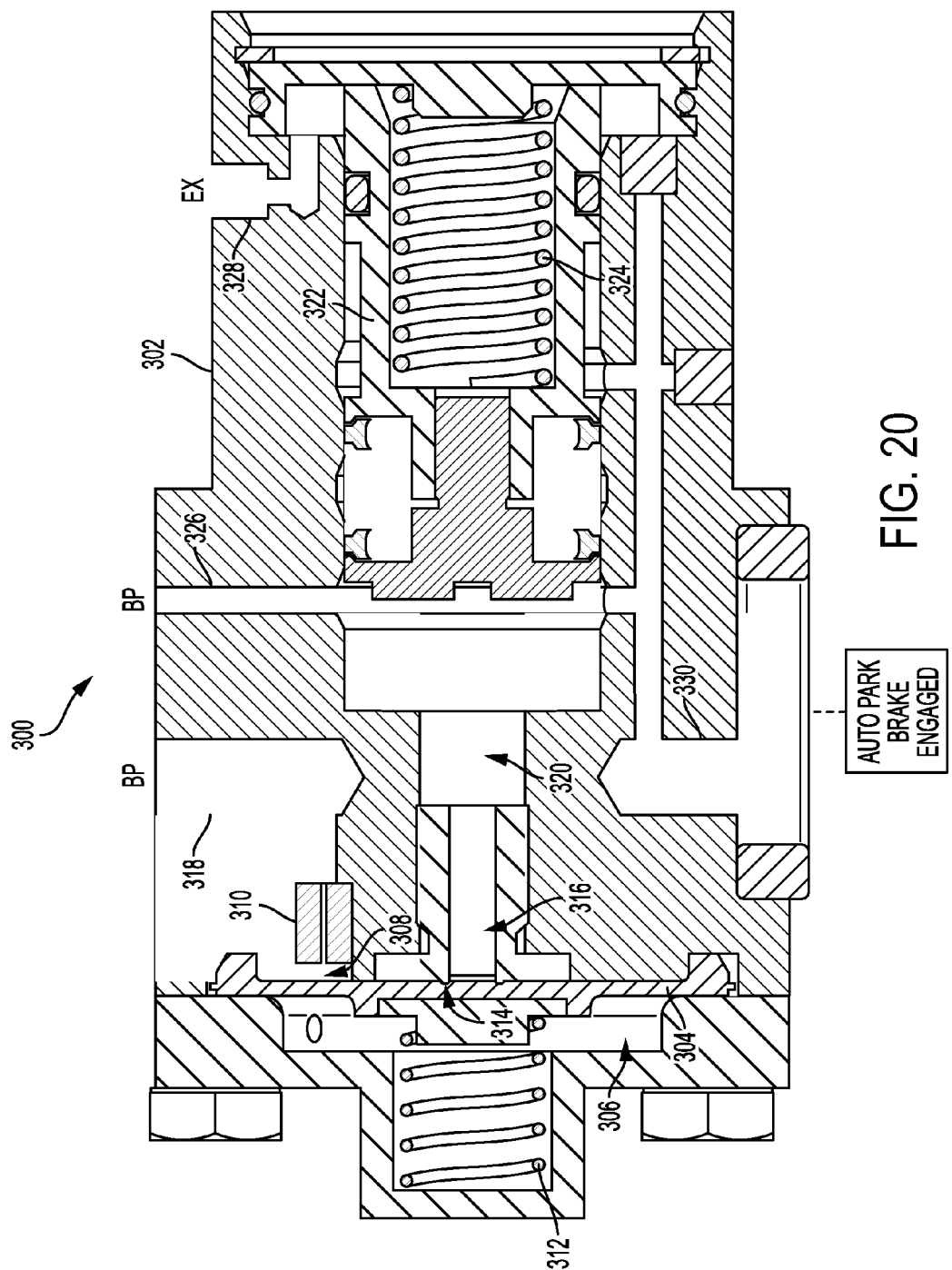
FIG. 20 is a schematic of the sequencing valve of FIG. 16 after a brake pipe pressure recharge and service brake release following a service brake application.

Referring to FIG. 19, a subsequent service brake application will resulting movement of valve 300 so that brake pipe BP pressure is allowed to flow to the automatic parking brake and, as a result, locking mechanism with disengage and release the parking brake. If brake pipe BP pressure is recharged after the service brake application, as seen in FIG. 20, valve 300 will remain in the second position during recharging, and after recharging is complete, so that brake pipe BP pressure is allowed to flow to the automatic parking brake, thereby retaining locking mechanism in the disengaged position so that parking brake stays off.

Table 1 below lists the condition of the various aspects of the braking system when any one of the embodiment of an automatic parking brake sequencing valve according to the present invention is in use, as described in detail above:

TABLE 1

| Condition | Brake Cylinder Psi | Brake Pipe Psi | After Orifice Psi | Automatic Parking Brake Locking Mechanism | | Braking Force |
|---|---|---|---|---|---|---|
| | | | | Engaged | Disengaged | On Off |
| No Automatic Parking Brake | 0 | 0 | 0 | X | | X |

TABLE 1-continued

| Condition | Brake Cylinder Psi | Brake Pipe Psi | After Orifice Psi | Automatic Parking Brake Locking Mechanism | | Braking Force | |
|---|---|---|---|---|---|---|---|
| | | | | Engaged | Disengaged | On | Off |
| No Automatic Parking Brake | 0 | Full BP | <Full BP | X | | | X |
| No Automatic Parking Brake | 0 | Full BP | Full BP | X | | | X |
| No Automatic Parking Brake | Service | Reduced BP | >Reduced BP | | X | X | |
| No Automatic Parking Brake | Service | Reduced BP | Reduced BP | | X | X | |
| Automatic Parking Brake | Emergency | 0 | 0 | X | | X | |
| Automatic Parking Brake | 0 | 0 | 0 | X | | | X |
| Automatic Parking Brake | 0 | Full BP | <Full BP | X | | | X |
| Automatic Parking Brake | 0 | Full BP | Full BP | X | | | X |
| No Automatic Parking Brake | Service | Reduced BP | >Reduced BP | | X | X | |
| No Automatic Parking Brake | Service | Reduced BP | Reduced BP | | X | X | |
| No Automatic Parking Brake | 0 | Full BP | <Full BP | | X | | X |
| No Automatic Parking Brake | 0 | Full BP | Full BP | | X | | X |

It should be recognized that valve 10, valve 100, valve 200, or valve 300 may be manufactured using various conventional valve structures and integrated directed into the automatic parking brake structure on the brake cylinder of a rail car or provided as a separate valve that is coupled to the automatic parking brake, such by mounting on the automatic parking brake or connecting it thereto using pneumatic lines.

What is claimed is:

1. A sequencing valve for an automatic parking brake, comprising:
   a housing having a first port for communication with a source of a brake pipe pressure, a second port for communication with an exhaust, and a third port for communication with a brake pipe pressure input of an automatic parking brake;
   a valve body moveable between a first position, wherein the first port is isolated and the second port and the third port are coupled, and a second position, wherein the second port is isolated and the first port and third port are coupled;
   a pilot interconnected to the valve body for moving the valve body from the first position to the second position.

2. The valve of claim 1, further comprising a spring biasing the valve body into the first position.

3. The valve of claim 2, wherein the pilot is configured to move the valve body from the first position to the second position against the bias of the spring after brake pipe pressure has been fully charged and then partially released.

4. The valve of claim 3, wherein the pilot comprises a piston positioned in a chamber having a first inlet on a first side of the piston that is coupled to a source of brake pipe pressure via a choke and second inlet on a second side of the piston that is coupled directly to a source of brake pipe pressure.

5. The valve of claim 3, wherein the piston is interconnected to the valve body by a stem to move the valve body into the second position when the pressure on the first side of the piston exceeds the pressure on the second side of the piston.

6. The valve of claim 1, wherein the pilot is configured to move the valve body from the first position to the second position after brake cylinder pressure has been fully charged.

7. The valve of claim 1, wherein the pilot is configured to move the valve body from the first position to the second position in response to pneumatic pressure supplied by a control valve.

8. The valve of claim 1, wherein the pilot comprises a diaphragm positioned between a first chamber in direct communication with a source of brake pipe pressure a second chamber in communication with a source of brake pipe pressure via a choke.

9. The valve of claim 8, further comprising a bead seat having a passage in communication with the valve body that is opened and closed by the diaphragm.

10. The valve of claim 9, wherein diaphragm opens the passage in the bead seat after brake pipe pressure has been fully charged and then partially released.

11. A method of sequencing an automatic parking brake, comprising the steps of:
   providing a valve having a first port for communication with a source of a brake pipe pressure, a second port for communication with exhaust, and a third port for communication with a brake pipe pressure input of an automatic parking brake and a valve body moveable between a first position, wherein the first port is isolated and the second port and the third port are coupled, and a second position, wherein the second port is isolated and the first port and third port are coupled;
   piloting the valve body from the first position to the second position to couple brake pipe pressure to the brake pipe pressure inlet of the automatic parking brake.

12. The method of claim 11, wherein the step of piloting of the valve body comprises the steps of applying brake pipe pressure to a first side of a piston via a choke and to a second side of the piston directly and then releasing the brake pipe pressure from the second side of the piston so that the piston moves and forces the valve body into the second position.

13. The method of claim 11, wherein the step of piloting of the valve body comprises the step of applying brake cylinder pressure directly to first side of a piston and to a second side of the piston via a choke so that the piston moves in response to brake cylinder pressure and forces the valve body into the second position.

14. The method of claim 11, wherein the step of piloting of the valve body comprises the step of applying pneumatic pressure from a control valve to first side of a piston and coupling an exhaust to a second side of the piston so that the piston moves in response to pressure supplied by the control valve and forces the valve body into the second position.

15. The method of claim 11, wherein the step of piloting of the valve body comprises the steps of applying brake pipe pressure directly to first side of a diaphragm and to a second side of the diaphragm via choke directly and then releasing the brake pipe pressure from the first side of the diaphragm so that the diaphragm opens a passage that allows brake pipe pressure to force the valve body into the second position.

* * * * *